United States Patent [19]

Moriwaki

[11] Patent Number: 4,695,912
[45] Date of Patent: Sep. 22, 1987

[54] DUSTPROOF LINER FOR A MAGNETIC DISC CARTRIDGE

[75] Inventor: Masayoshi Moriwaki, Kanagawa, Japan

[73] Assignee: Fuji Photo Film Co., Ltd., Kanagawa, Japan

[21] Appl. No.: 866,834

[22] Filed: May 27, 1986

[30] Foreign Application Priority Data

Jun. 14, 1985 [JP] Japan .............................. 60-89014[U]

[51] Int. Cl.$^4$ ............................................. G11B 23/03
[52] U.S. Cl. .................................... 360/133; 360/128
[58] Field of Search ....................... 360/133, 137, 128

[56] References Cited

U.S. PATENT DOCUMENTS 4,223,361  9/1980  Zaitsu et al. ......................... 360/133
4,251,843  2/1981  Masuyama et al. ............. 360/133 X
4,485,421  11/1984  Hoshino .............................. 360/133

Primary Examiner—John H. Wolff
Attorney, Agent, or Firm—Sughrue, Mion, Zinn, Macpeak, and Seas

[57] ABSTRACT

A magnetic disc cartridge contains a pair of dust liners sandwiching the magnetic disc. Each liner has a double layer construction consisting of an outer layer and an inner layer. The outer layer is an unwoven cloth layer which has a high surface resistivity, which is electrostatically chargeable, and which attracts and absorbs dust particles, while the inner layer, which faces the disc, is apertured and is impregnated with a surface agent to produce a much lower surface resistivity to preclude a static charge, so that, during dynamic operation of the disc, the differential charge that exists in the inner/outer layers causes dust particles to pass through the apertured inner layer and become entrapped in the charged outer layer.

8 Claims, 3 Drawing Figures

DUSTPROOF LINER FOR A MAGNETIC DISC CARTRIDGE

BACKGROUND

1. Field of the Invention

This invention relates in general to a magnetic disc cartridge in which a disc-shaped, extremely thin magnetic recording medium, namely, a magnetic disc sheet, is rotatably supported. More particularly, the invention relates to a magnetic disc cartridge in which a liner is in sliding contact with the magnetic disc sheet to protect and clean the sheet.

2. Background Art

In general, writing magnetic recording data into a magnetic disc sheet or reading the data out of it is carried out with a writing or reading head which is moved radially with respect to the sheet which is being rotated. Therefore, dust, contaminating material, or particles on the surface of the sheet may cause failures in reading or writing of data, i.e., dropouts. This difficulty is serious because magnetic disc cartridges are used mainly as digital data memories in computers or the like and a single data error may be unacceptable.

Accordingly, in some of the conventional magnetic disc cartridges, the cases are made of relatively flexible pressed paper or synthetic resin, or hardened synthetic resin, and have openings provided with dust shutters. In each of these cases, a liner made of unwoven cloth or the like is provided on the inner wall, to protect the magnetic disc sheet and to remove dust, etc. from the surface of the sheet. In some of the conventional magnetic disc cartridges, a spacer of synthetic resin or the like is provided between the liner and the inner wall of the case. The spacer brings the liner into elastic contact with the surface of the sheet, to improve the cleaning effect of the liner.

As is apparent from the above description, various protecting means such as means for preventing charging and dustproofing means utilizing a dust absorbing or collecting action are provided. However, these means still produce unsatisfactory results. Furthermore, after the magnetic disc cartridge is used for a long period, fibers become detached from the liner and drop onto the magnetic disc sheet. Also, external dust particles gradually accumulate on the magnetic disc sheet, thus causing frequent dropouts.

SUMMARY OF THE INVENTION

Accordingly, an object of the invention is to provide a magnetic disc cartridge having liners which are effective in removing dust from the surface of the magnetic disc sheet over a long period of time.

The invention can be summarized as a magnetic disc cartridge in which a magnetic disc sheet is rotatably supported in a case. Two liners are provided, one between the magnetic disc and the upper inner wall of the case and the other between the magnetic disc and the lower inner wall of the case. At least one of the liners is of a double structure made up of a first unwoven cloth layer which is positioned adjacent to the inner wall and is electrostatically chargeable. The double structure includes a second unwoven cloth layer which is in contact with the surface of the disc and is not electrostatically chargeable. The second, nonchargeable unwoven cloth layer has at least one aperture or hole through which dust particles can pass to be trapped by the electrostatically charaged first cloth layer.

DETAILED DESCRIPTION OF THE PREFERRED EMBODIMENT

Figure 1:
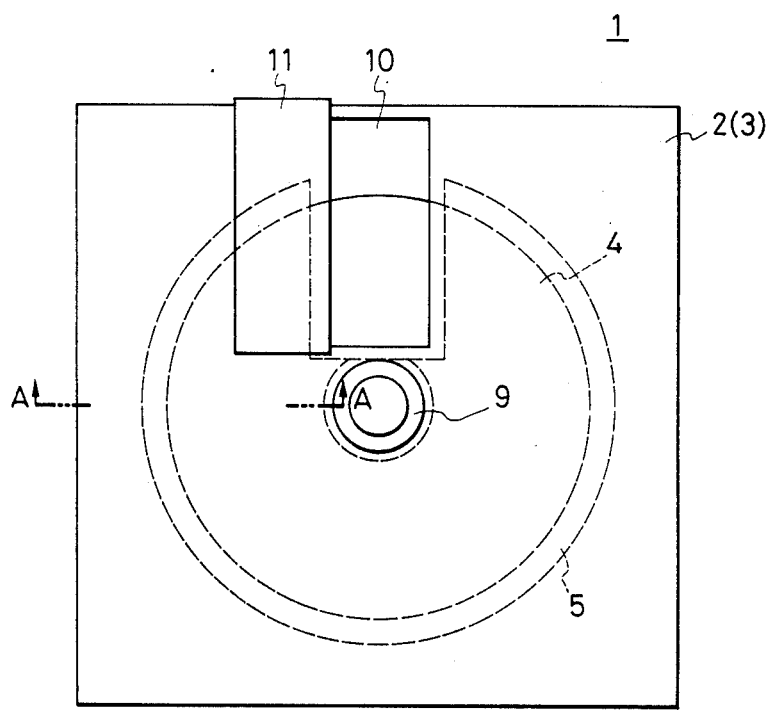
FIG. 1 is a plan view of a magnetic disc cartridge which is the one embodiment of the invention.
Figure 3:
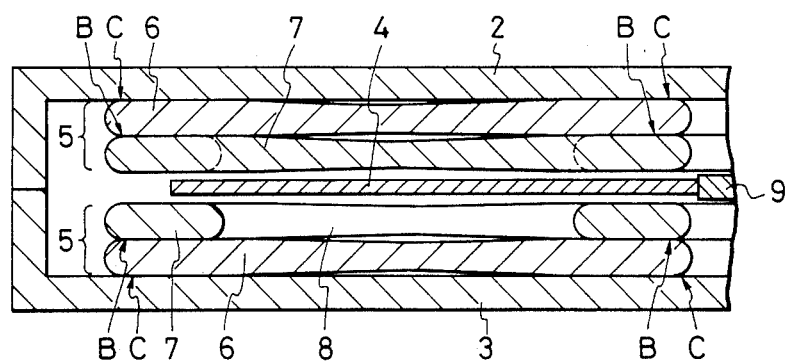
FIG. 3 is an enlarged sectional view taken along line A—A in FIG. 1.

The magnetic disc cartridge 1 of one embodiment of the invention, as shown in FIGS. 1 and 3 includes a case made up of the upper and lower halves 2 and 3 each of which is composed of a relatively hard plastic resin. A magnetic recording medium, namely, a magnetic disc sheet 4 is inserted in the case between the halves. Two sets liners 5 of unwoven cloth are positioned on either side of the magnetic disc 4 within the case and protect and clean the magnetic disc 4. The magnetic disc 4 has a center core 9 at its center which is held by the rotating spindle of the recording and reproducing device. The case has an opening 10 which is provided for the magnetic head, and a dust shutter 11 which is adapted to close over the opening 10. Similarly to a conventional magnetic disc cartridge, a spacer (not shown) is provided between the case and each of the liners 5.

Figure 2:
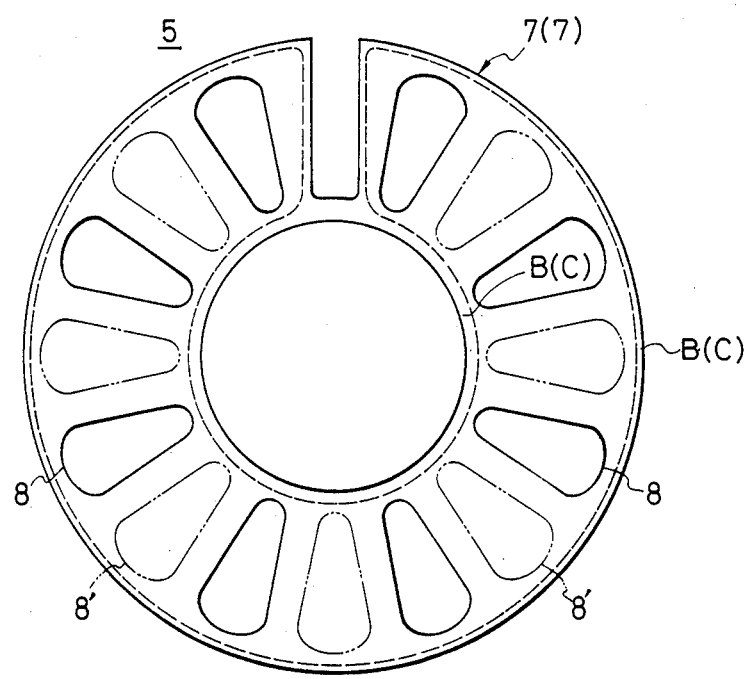
FIG. 2 is a plan view of a liner in the magnetic disc cartridge.

The liners 5 are arranged on both sides of the magnetic disc 4. The liners 5 are substantially annular in shape, as shown in FIG. 2, so as to cover the sheet recording surfaces of the disc sheet 4. Each liner 5 is of a double structure which is made up of first (outer) and second (inner) unwoven cloth layers 6 and 7 which are different from each other both in construction and in electrical characteristics. The second, inner unwoven cloth layer 7 has a plurality of elongated through-holes 8 extending radially, as shown in FIG. 2. As shown in FIG. 3, the first, outer unwoven cloth layers 6 are bonded to the inner walls of the case 2 and 3, while second, inner unwoven cloth layers 7 are bonded to the first unwoven cloth layers 6, in such a manner that the second, inner unwoven cloth layers 7 are in respective contact with the opposed surfaces of the disc sheet 4.

The first and second unwoven cloth layers 6 and 7 are bonded together only in a peripheral region B (indicated by the broken line in FIG. 2), i.e., only on the periphery. The bonding of each liner 5 to the corresponding one of the case halves 2 and 3 is also effected only in a peripheral region C which is the periphery of the first unwoven cloth layer 6. Accordingly, the liners 5 are flexibly in contact with the surface of the magnetic disc 4 to some extent.

The liners 5 provided respectively in the upper and lower halves 2 and 3 (hereinafter referred to as "the upper and lower liners 5") have the aforementioned elongated through-holes 8 oriented in such a manner that the holes 8 of the upper liner 5 are shifted from the holes 8' of the lower liner 5. Therefore, the disc 4 is uniformly supported by the upper and lower liners 5 in its entirety.

The second, inner unwoven cloth layers 7 may be made of a material which comprises about 80 wt % "rayon" fibers and about 20 wt % polypropylene polyester compound fibers and further includes, for instance, pitch or polyacrylonitrile carbon fibers. The material may be impregnated with a surface active agent or lubricant. For example, natural active agents, saponin, carboxylic amion, and etc. are available for a surface active agent. Ethyl palmitate, butyl stearate, silicon oil and so on are available for a lubricant. The surface resistivity of the second, inner unwoven cloth layer 7 is reduced to $10^8$ ohms (per square) or lower by adding carbon fibers or a surface active agent as described above in order that it may not be come statically charged. Accordingly, the second unwoven cloth layer 7 is scarcely charged even when rubbed by the surface of the disc 4.

The material of the first, outer unwoven cloth layers 6 is a blended fabric which consists of about 80 wt % "rayon" fibers and about 20 wt % polypropylene polyester compound fibers. Therefore, the surface resistivity of the first unwoven cloth layer 6 is high, $10^{12}$ ohms or higher. Accordingly, the first unwoven cloth layer 6 is readily electrostatically charged so that it attracts and absorbs dust.

The function of the liners 5 thus constructed will now be described in detail. When the magnetic disc cartridge 1 is used, the magnetic disc 4 is rotated and is in frictional contact with the liners 5. The electrostatic charges produced by the friction pass through the second, inner unwoven cloth layers 7 readily, but are trapped by the first, outer unwoven cloth layers 6. In other words, the second, inner unwoven cloth layers 7 are not charged, while the first, outer cloth layers 6 are charged. As was described above, the first and second unwoven cloth layers 6 and 7 are bonded together only in the periphery. Therefore, as the disc 4 is rotated, the unwoven cloth layers, being vibrated by the rotation, are repeatedly brought into contact with each other and moved away from each other. That is, the first, outer unwoven cloth layers 6 may be charged by so-called "peel charging".

As was described above, the second, inner unwoven cloth layer 7 is not charged, but the first, outer unwoven cloth layer 6 is charged. Therefore, dust particles between the disc sheet 4 and the second, inner unwoven cloth layer 7 are electrically attracted so that they are moved through the holes 8 towards the first, outer unwoven cloth layer 6. Since the holes 8 are elongated radially with respect to the disc 4, the edges of the holes, which are in contact with the disc surface, scrape the dust particles. Some of the dust particles are isolated from the disc 4 by means of the second, inner unwoven cloth layer 7. Thus, the dust particles caught by the unwoven cloth layers will never migrate back towards the disc sheet 4. That is, they will never cause dropouts.

In the above-described embodiment, a plurality of elongated holes 8 are formed in the liners 5. However, the invention is not so limited. That is, the configuration and size of the holes 8 may be changed as the case may be. In addition, the second, inner unwoven cloth layer 7 may be so designed that it has only one hole 8. Furthermore, instead of forming the holes 8 in the second, inner unwoven cloth layer 7, the inner layer 7 may be replaced by a porous unwoven cloth layer. It goes without saying that these changes and modifications fall within the concept and scope of the invention.

The embodiment of the invention has been described with reference to the case where the magnetic disc case is hard. However, the invention is not limited thereto. That is, the technical concept of the utility model is applicable to various other floppy discs.

As was described above, each of the liners 5 according to the invention is of a dual structure. Each liner is made up of the non-chargeable inner unwoven cloth layer 7 and the chargeable outer unwoven cloth layer 6, and the holes 8 are formed in the inner unwoven cloth layer 7. Therefore, dust particles can be effectively removed from the surface of the magnetic disc sheet by the static electricity of the outer unwoven cloth layers 6. That is, the liners 5 provide a considerably significant dustproofing protection in that dust particles are collected at the positions which are not in contact with the surfaces of the disc 4. Therefore, in the magnetic disc cartridge according to the invention, the dropout due to dust particles is effectively prevented, and the surfaces of the magnetic disc sheet are maintained clean for a long period.

What we claim is:

1. A disc cartridge, comprising:
   a case having an upper case half and a lower case half,
   a disc sheet having two surfaces and adapted to be rotated within said case between said upper and lower case halves; and
   a first liner disposed between said disc sheet and said upper case half, and a second liner disposed between said disc sheet and said lower disc half, each liner comprising a double-layered structure with a first layer, positioned adjacent to, and secured to, a different one of said upper and lower case halves and being electrostatically chargeable, and a second layer, positioned adjacent a different one of said disc surfaces and being electrostatically non-chargeable, said first and second layers being bonded to each other, each said second layer having aperture means therein and facing a distinct recording portion of a respective one of said disc surfaces and permitting passage of dust particles from said disc sheet through said second layer aperture means onto said first layer.

2. A disc cartridge as recited in claim 1, wherein said first and second layers each comprises an unwoven cloth layer.

3. A disc cartridge as recited in claim 1, wherein said first layer has a surface resistivity of $10^{12}$ ohms or higher, to make said first layer substantially chargeable, and said second layer has a surface resistivity of $10^8$ ohms or lower to make said second layer substantially non-chargeable.

4. A disc cartridge as recited in claim 2, wherein said first layer has a surface resistivity of $10^{12}$ ohms or higher, to make said first layer substantially chargeable, and said second layer has a surface resistivity of $10^8$ ohms or lower to make said second layer substantially non-chargeable.

5. A disc cartridge as recited in claim 1, wherein said first and second layers are bonded together only in peripheral portions thereof.

6. A disc cartridge as recited in claim 1, wherein each of said first and second liners is of a substantially annular, circular shape and said aperture means comprises at least one elongated hole extending radially in said annular shape.

7. A disc cartridge as recited in claim 6, wherein said aperture means includes a plurality of holes.

8. A disc cartridge as recited in claim 7, wherein said holes are disposed in said liners such that no hole of one of said liners faces any hole of the other of said liners.

* * * * *